(12) United States Patent
D'Amore

(10) Patent No.: US 8,141,039 B2
(45) Date of Patent: Mar. 20, 2012

(54) METHOD AND SYSTEM FOR CONSOLIDATING MACHINE READABLE CODE

(75) Inventor: Cristiana D'Amore, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1379 days.

(21) Appl. No.: 11/733,303

(22) Filed: Apr. 10, 2007

(65) Prior Publication Data

US 2007/0283335 A1 Dec. 6, 2007

(30) Foreign Application Priority Data

Apr. 28, 2006 (EP) .................................. 06113309

(51) Int. Cl.
*G06F 9/44* (2006.01)
(52) U.S. Cl. ........................................... 717/120
(58) Field of Classification Search ................... 717/120
See application file for complete search history.

(56) References Cited

U.S. PATENT DOCUMENTS

| 5,359,524 | A  | * | 10/1994 | Rohan ............................. 700/99 |
| 6,922,829 | B2 | * | 7/2005  | Ward et al. ..................... 717/154 |
| 2003/0070157 | A1 | * | 4/2003 | Adams et al. ................... 717/101 |
| 2005/0210442 | A1 | * | 9/2005 | Seetharaman et al. ........ 717/101 |
| 2006/0031078 | A1 | * | 2/2006 | Pizzinger et al. ................. 705/1 |
| 2007/0168912 | A1 | * | 7/2007 | Takashima et al. ............ 717/101 |
| 2010/0042979 | A1 | * | 2/2010 | Nanja et al. .................... 717/136 |
| 2011/0138352 | A1 | * | 6/2011 | Ciprino et al. ................. 717/101 |

OTHER PUBLICATIONS

Dane, "Modular Program Size Counting", Dec. 1999, University of Hawaii.*
Laranjeira, "Software Size Estimation of Object-Oriented Systems", May 1990, IEEE.*
Li et al., "Object Oriented Metrics Which Predict Maintainability", Feb. 1993, Computer Science Department of Virginia Tech.*

* cited by examiner

*Primary Examiner* — Anna Deng
*Assistant Examiner* — Junchun Wu
(74) *Attorney, Agent, or Firm* — Yee & Associates, P.C.; Jeffrey S. LaBaw

(57) ABSTRACT

A method of consolidating machine readable code determines for part of a programming project a projected size L. When available, the actual size of the part, L' is determined. L and L' are compared to determine whether the actual size L' exceeds the projected size. In a case where the actual size of the part L' is determined to exceed the projected size L, the completed project part is rejected. In a case where the size of the completed project part L' does not exceed the projected size L, the part is integrated into the project, and the project is compiled, or built.

13 Claims, 5 Drawing Sheets

METHOD AND SYSTEM FOR CONSOLIDATING MACHINE READABLE CODE

FIELD OF THE INVENTION

The present invention concerns the consolidating machine readable code with reference to a planned structure.

BACKGROUND OF THE INVENTION

According to conventional software development techniques, an automated code counting tool is triggered when integrating code into official library to determine the number of lines present. Comparison with a previous version of the file is computed while the code checking in, allowing the developer to evaluate the impact of the change in terms of lines of code added.

This information is collected for each production build to build up a curve as shown in FIG. 1. FIG. 1 shows a curve 101 of expected values, and curve 102 representing actual count values as determined by the code counting tool for a product release starting from an existing code base on top of which the new one is to be developed. The predicted curve is prepared starting from the design of the new product and prototypes of its various components. With these two elements, development teams typically calculate the expected amount of code that will be produced. As can be seen in this example, the values from the start of the project until 23rd March substantially fit the projected curve. The count for the $4^{th}$ April however shows a substantial deviation from the expected count value. In such a case where the curve is not as expected, typically the quantity of integrated code is higher than planned, a backward analysis is conducted to understand which are the tracks that are responsible for the measured deviation. Such deviations originate either from an erroneous assumption, which means that the design or prototype were insufficient, or code has been added for functionalities that were not planned at the beginning, or in a worst case unnecessary code has been written FIG. 2 shows a method of software development according to the prior art approach described with respect to FIG. 1. The method starts at step 201, and proceeds at step 203 to add code to the project. This will generally be in the context of a particular module or other functional subdivision of the program, which is intended to perform a particular task. Once the programmer or development team completes the module, as determined at step 205, the project as a whole is compiled or "built" at step 207, incorporating the new module. The quantity of code constituting the complete project is next measured or counted. In some cases as described above, the code added at step 203 may be anomalous, for example in that it contains more or less code than would normally be expected for code implementing the functions of such a module. Such an anomaly will therefore be apparent in the code count value determined at step 209. At step 211 it is accordingly determined whether the project contains an anomalous quantity of code. In a case where the project is found to contain an anomalous quantity of code, the method proceeds to step 213, at which the project as a whole is analysed, to identify the anomaly. Once the anomaly is identified, the code can be repaired at step 215 before considering at step 217 whether the project is now complete. In a case where the project is found at step 211 to have the expected quantity of code, it is then considered at step 217 whether the project is now complete. If the project is complete, the method ends at step 219. Otherwise, the method returns to step 203 to begin work on the next section of the project.

SUMMARY OF THE INVENTION

According to the present invention as defined in the appended independent claim 1 there is provided a method of consolidating machine readable code. There is further provided a system as defined in the appended claim 9, a computer program as defined in the appended claim 10 and a computer readable medium as defined in the appended claim 11. Preferred embodiments are defined in the dependent claims.

Thus by identifying deviations from an expected code count for each program part before it is integrated into tile project as a whole, the time consuming and difficult regressive analysis required by the prior art approach. Since a project part is only compiled if it has been determined not to include unnecessary code, the demand on processing power for the compilation process is reduced by adopting the present invention. By processing the code at an earlier stage, excess code will be detected earlier and more reliably, reducing the amount of data storage required for the project as a whole.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

As the size and complexity of software development projects increase, the prior art methods as described above have been found to be increasingly cumbersome. In particular, the step of reviewing a compiled project to identify anomalous code is becoming undesirably burdensome.

Figure 1:
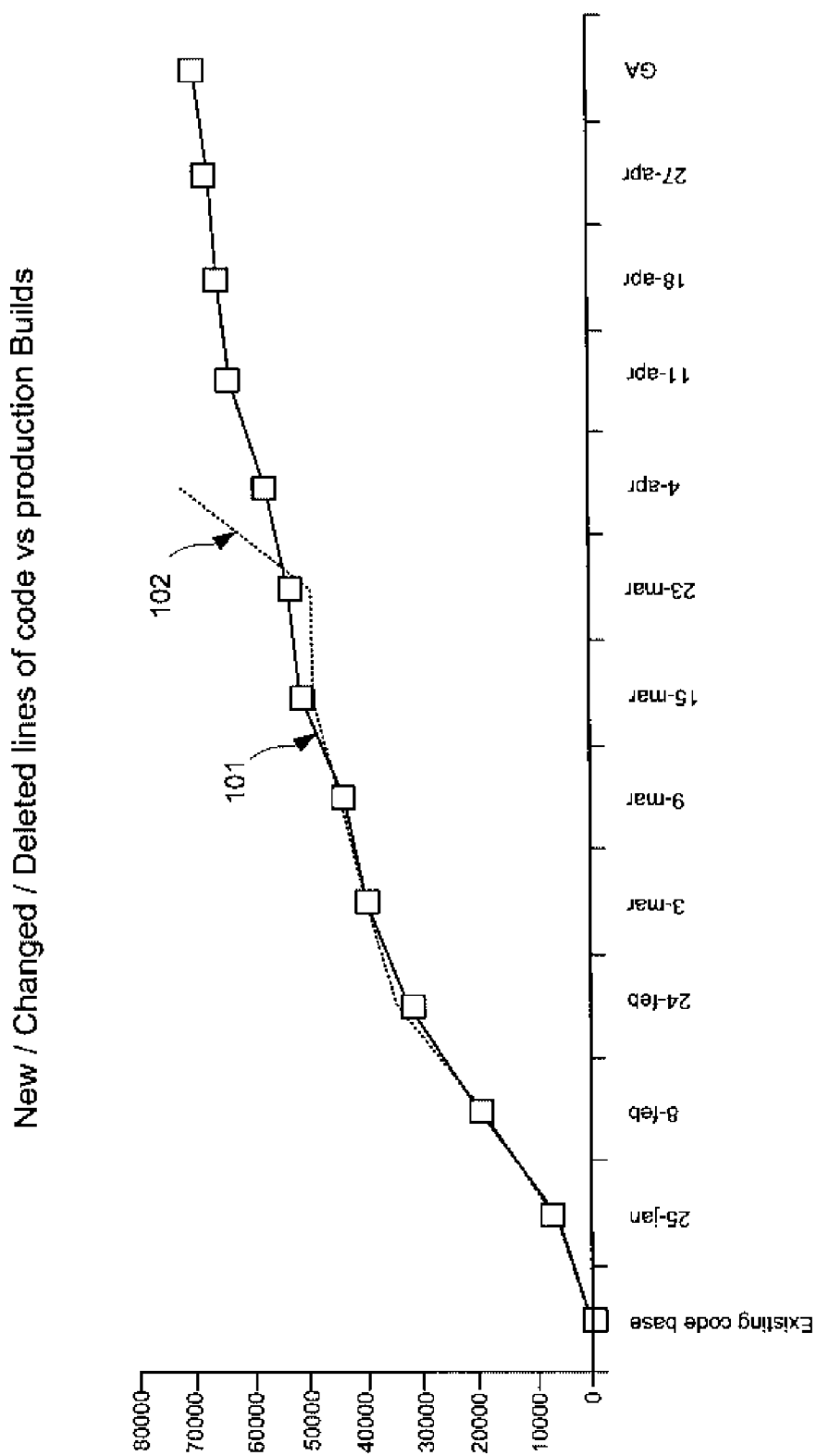
FIG. 1 shows a curve 101 of expected values, and curve 102 representing actual count values as determined by the code counting tool for a product release starting from an existing code base on top of which the new one is to be developed.
Figure 2:
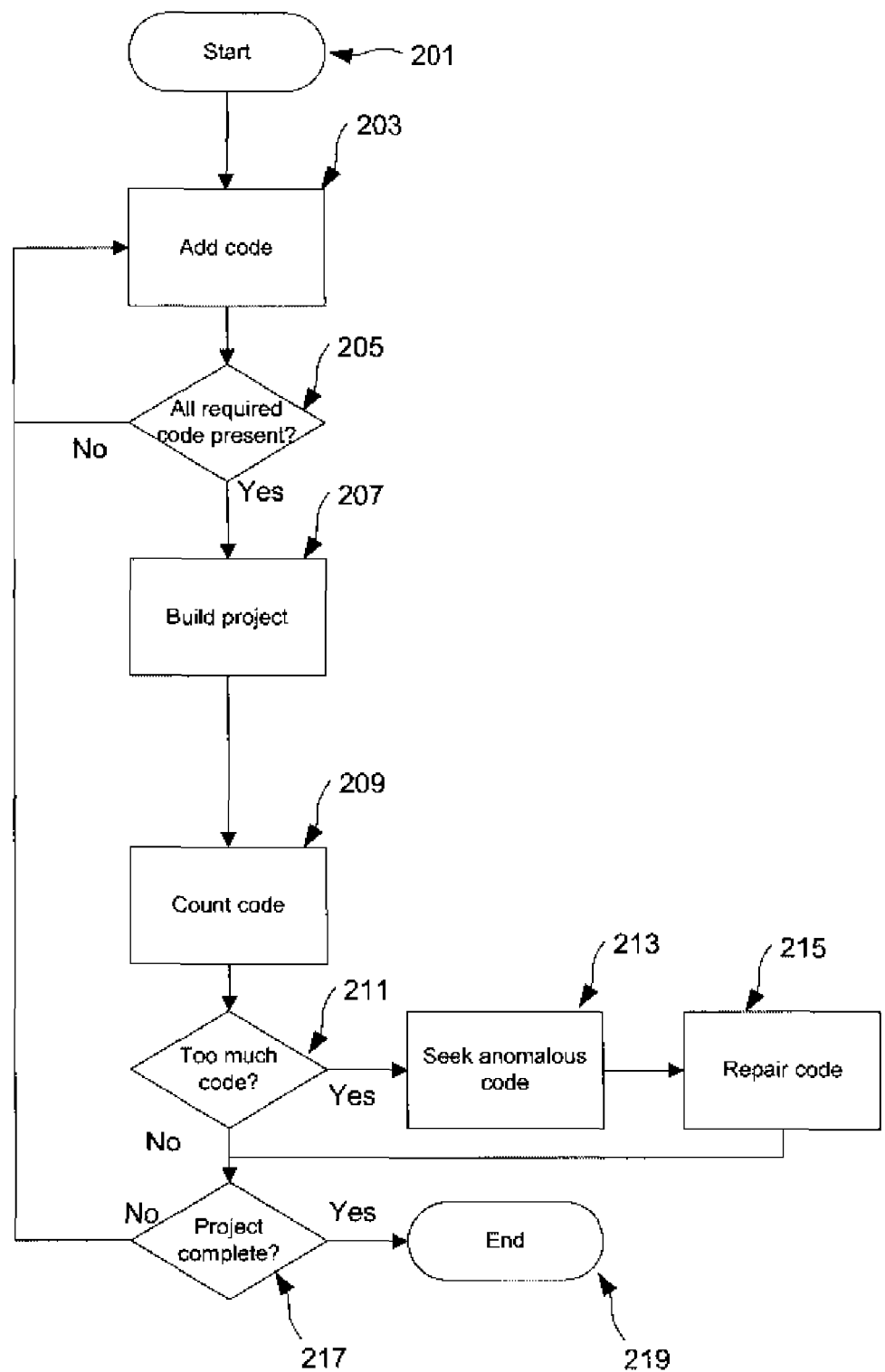
FIG. 2 shows a method of software development according to the prior art approach described with respect to FIG. 1.
Figure 3:
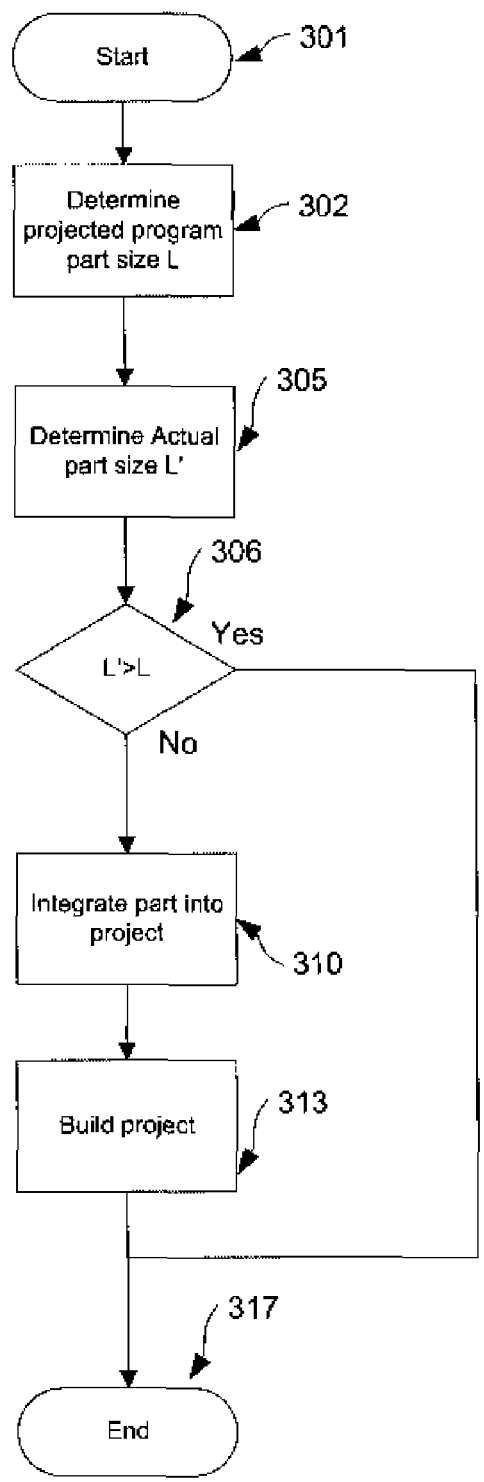
FIG. 3 shows a method of software development according to a first embodiment.

FIG. 3 shows a method of software development according to a first embodiment. The method of consolidating machine readable code starts at step 301 and then at step 302 determines for part of a programming project a projected size L. When available, the actual size of the part, L' is determined at step 305. L and L' are compared at step 306 to determine whether the actual size L' exceeds the projected size. In a case where the actual size of the part L' is determined to exceed the projected size L, the completed project part is rejected. In a case where the size of the completed project part L' does not exceed the projected size L, the part is integrated into the project at step 310, and the project is compiled, or built, at step 313. The method then terminates at step 317.

Preferably at step 306 it is required that the actual size L' exceed the predicted size L by a predetermined margin. Preferably, the project will comprise a plurality of parts, in which case step 301 will comprise dividing a programming project into a plurality of project parts and determining for each part a projected size. This will generally be in the context of a particular module or other functional subdivision of the program, which is intended to perform a particular task. Preferably, in a case where the completed project part is rejected, it is processed so as to identify and remedy anomalous components, and resubmitted a completed project part for integration to said project.

Preferably, while creating a production level of code, at step 305 the number of changed lines of source is automatically calculated with the appropriate language tool. Since generally the counting process will be different depending on the programming language used, different counting tools may triggered automatically depending on the programming language used for example Java, C++, etc. The method may automatically detect the language being used for example by reference to a library of language characteristics, or may depend on a user setting or selection.

Step 305 may also include the preparation of a report providing information gathered during the counting process reflecting on size or complexity of the software. This report can be used for easier verification planning, since an appropriate regression test can be planned upon number of lines of code changed when greater than expected so that appropriate actions may be taken.

Since each part of the project is compared to an expected size before integration into the project as a whole, the requirement to carry out a backward analysis of the project is avoided. This approach furthermore helps in keeping control on quality criteria and quality certification. Is the amount of code produced in line with projected? If not, the tracks/defects responsible for the unexpected change are uniquely identified, avoiding post mortem activities and analysis to understand the root cause for a deviation from the projections. If unexpected changes have been implemented, a design change could be called for.

Figure 4:
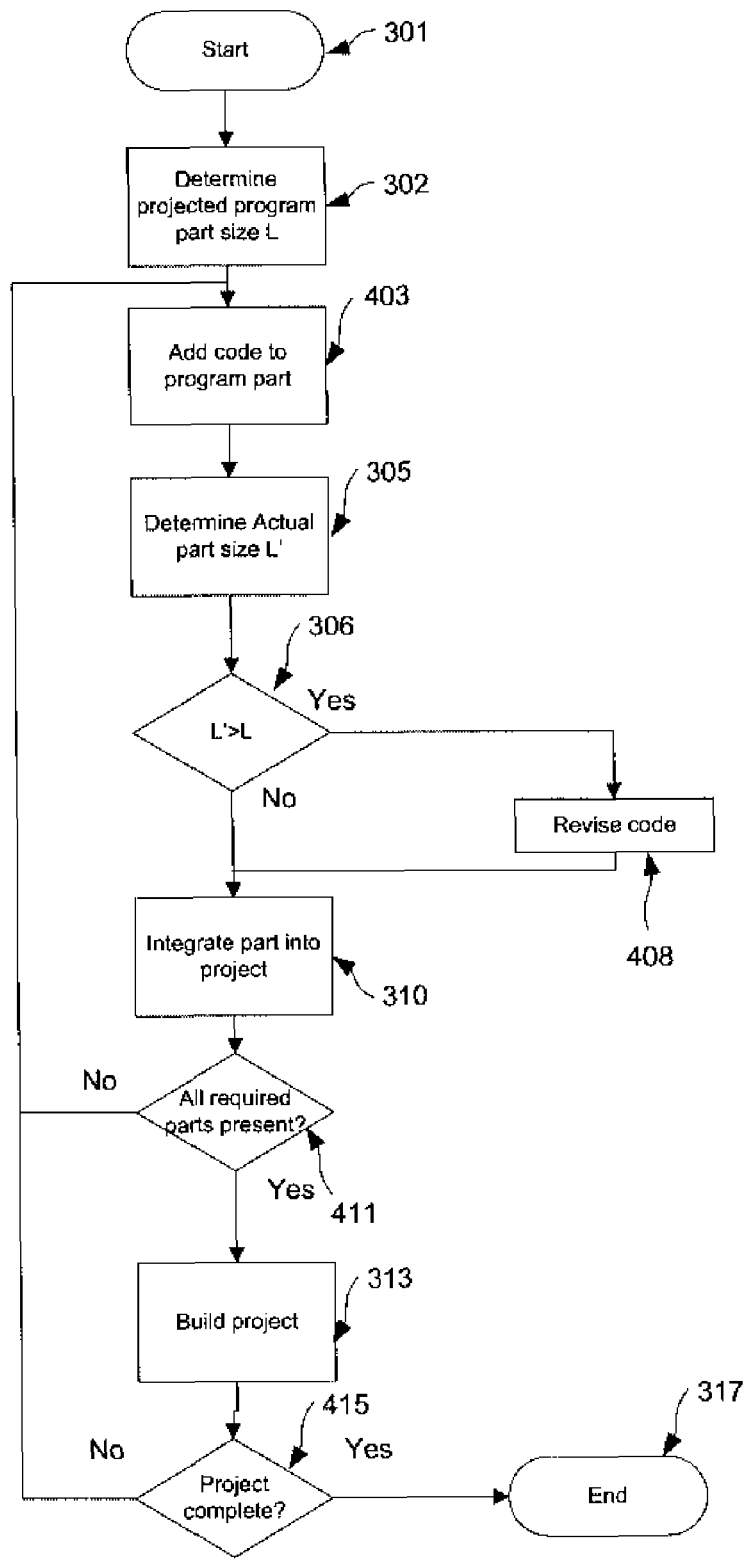
FIG. 4 shows a second embodiment.

FIG. 4 shows a second embodiment. This second embodiment is a further development of that of FIG. 3. The method starts at step 301, and proceeds at step 403 to add code to the program part. This may mean starting a new piece of code, or may involve adding to existing code. The part or module including the newly added code is counted at step 305. In some cases, as described above the program part may be anomalous, for example in that it contains more or less code than would normally be expected for code implementing the functions of such a module. Such an anomaly will therefore be apparent in the code count value determined at step 305. At step 306 it is accordingly determined whether the module contains an anomalous quantity of code as described with reference to FIG. 3. In a case where the project is found to contain an anomalous quantity of code, the method proceeds to step 408, at which the code can be reviewed, revised or repaired before integration into the project at step 310 as described with regard to FIG. 3 after which the method proceeds to step 411. Specifically, at step 408 a track is generated. A track is the implementation on a product release of the code changes needed to fix a defect. For one single defect such as the core sump on HP platform, for instance different changes in the code might be required depending on the release of the product in which the problem is fixed. At step 411 it is determined whether all code required for a build to be carried out is present. In a case where all parts are found to be present, the project is built as described with respect to FIG. 3. In a case where parts are found to be missing, the method returns to step 305, for work to proceed on a new or not yet completed program part. In a case where the project is found at step 306 to have the expected quantity of code, the method proceeds directly to step 310 as described above. At step 415 it is determined whether the project is in fact now complete, in which case the method ends at step 317, or otherwise the method returns to step 303 for preparation of the next section of code, and so on until the project is complete.

Thus this embodiment offers the further advantage, the track will not be integrated into the project without the code having passed the needed review, as may occur in the prior art.

Figure 5:
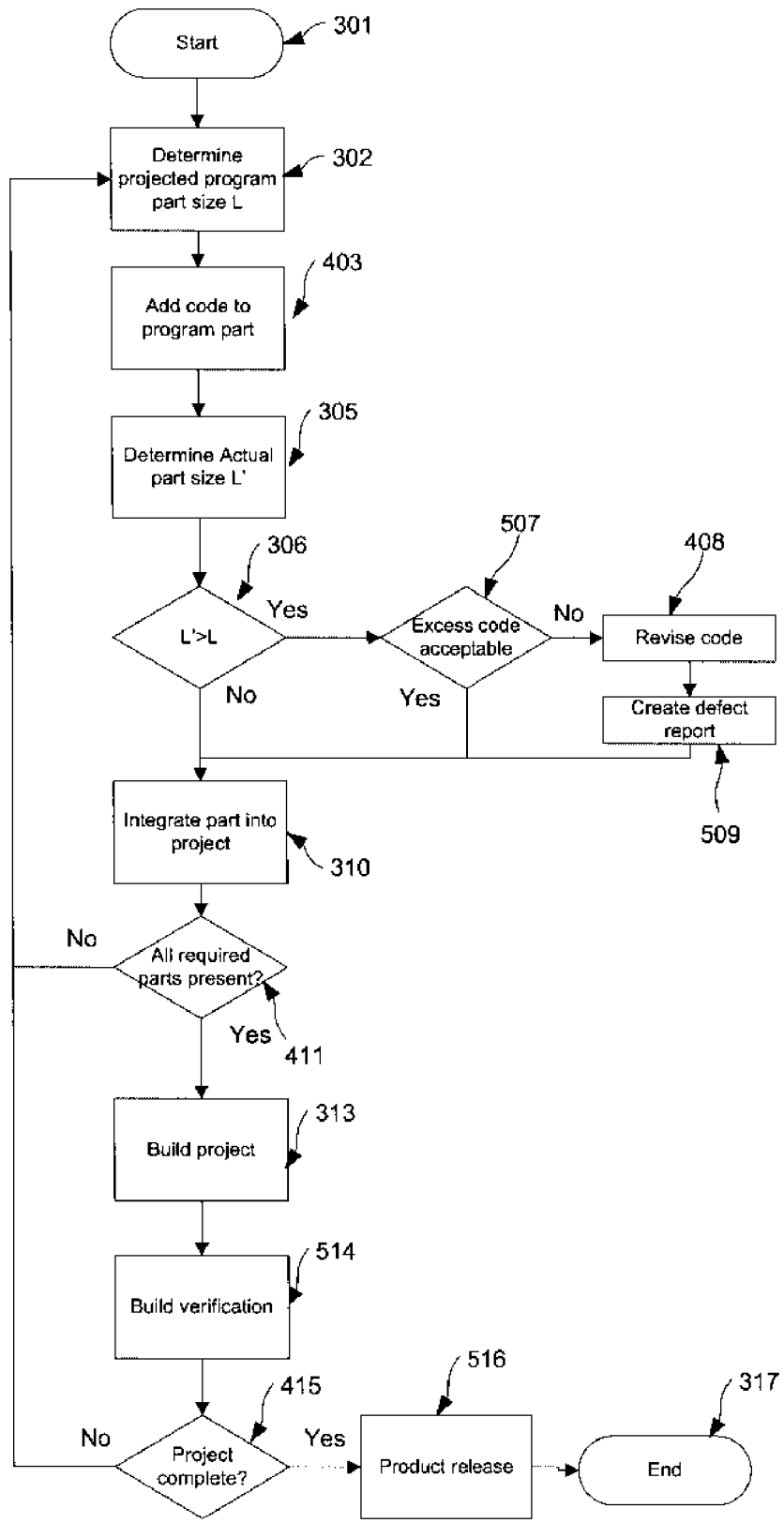
FIG. 5 shows a third embodiment.

FIG. 5 shows a third embodiment. The third embodiment is a still further development of the first and second embodiments. As shown in FIG. 5, at step 306 it is determined whether the module contains an anomalous quantity of code as described with reference to FIG. 3 or 4. In a case where the project is found to contain an anomalous quantity of code, the method proceeds to step 507, at which a review of the module is carried out. Step 507 constitutes a code review process. Code goes under review to check if it is aligned to the design or in general if it makes sense. If yes, everything is ok, if not, code will require revision.

This review determines the root of the divergence between the projected module size L and the actual value L'. This process is preferably automated. In a large majority (e.g. 99%) of cases the deviation will be positive, i.e. the actual code size will exceed the predicted size, meaning that more lines of code or produced compared to the prediction. A number of possible explanations for excess code made be envisaged:

1. The original design is incomplete, for example by failing to take into account aspects necessary for a real or practical implementation. (about 50% of cases)
2. Although the design is correct its implications in terms of code requirements were not properly appreciated when making predictions based on it, or a part of the design was overlooked altogether.
3. Changes were made after completion of the design which affect code count, for example in response to a customers' request or customers' problems.
4. The developer has written unnecessary code—this is relatively rare.

When it is determined at step 507 that the excess code is not acceptable, and should not be retained, a track is generated at step 408. The track is the implementation on a product release of the code changes needed to fix a defect. For one single defect such as the core sump on HP platform, for instance different changes in the code might be required depending on the release of the product in which the problem is fixed. At step 509 the track may be associated with explanations or descriptions can be added to the defect. Two additional fields could be used in the defect description:
a) Programming language
b) For each programming language a lines of code counting tool Usually a defect description will include a use case to reproduce the problem, release the problem has been found in, whether the documentation should be changed as well, and so forth. In general, the tester tries to be as descriptive as possible when opening/creating a new defect.

While the latter can be set at library configuration time, the former is specified when checking in the code. Based on the programming language, the check-in action triggers the tool launch, and the number of lines of code is computed. When creating a production build level, the overall amount of CSI (Changed Source Instructions) can be easily and automatically computed.

The production build is the build for the code that will be given to the test team, and not the code that is built for internal development purposes. Other builds are referred to as development builds.

The third embodiment further provides a verification step 514 after the step 313 of building the project. This is a test phase, which is implemented whenever a 'production build' is ready.

It is an advantage of this third embodiment that the verification team would know in advance what to expect from the current code level they are supposed to test, and if more code than expected is produced, for any good reason, they can properly readjust the verification plans to rim more or different test cases.

If at step 507 it is determined that extra code was present due to reason (1), (2) or (3) that is, for reasons which are likely to justify the retention of the extra code, typically the test plans will not include coverage of this code. For example, a developer produces a function that upon a graphical interface needs to take in input a parameter and store it into a file. When adding code the developer finds out that the code is more than expected because he realized that an additional entry field must be put into the graphical interface to capture also another user input value that is important for the processing. If the initial design did not include this second input value, the test did not plan to spend some time testing that the value is correctly captured from the input interface and correctly written into a file. Therefore the corrective action in this case, after a code review is done and it is agreed the additional code is needed, is to automatically update the design documents and update the test plans to properly document and test what was initially not properly considered. Step 301 may thus include steps of developing test patterns corresponding to the project design, and in a case where extra code is detected, modifications to the test patter may be generated for implementation in a case where the extra code is retained.

As described with respect to FIG. 3, at step 307 it is determined whether the project part includes too much code, which as mentioned above is likely to be the most common anomalous situation. It will be appreciated of course that other embodiments will allow for the detection of other anomalous conditions, for example the presence of two little code, code in an unexpected format or programming language, code implementing unexpected functions or including or referencing unexpected libraries or modules, code containing particular material such a copyright messages, licensing terms, and so on.

As described above with respect to the code count step 305 can be implemented at a number of points. As described with reference to FIG. 3, the code count may be carried out with a particular time frequency, for example once per day, once per hour etc. A code count may be triggered by a user implementing a save operation, running a debugging tool etc. A code count is in any case preferable automatically triggered by an attempt by a user to integrate code into the project. A running count of the code may be maintained as it is written, in which case functions can initiated as a function of the amount of code present. A user may be presented with an indicator of the proportion of the amount of code allotted to a particular project part has been used or otherwise warned of any deviation from the planned path as the code is written.

Processing may be automatically requested when a threshold is reached, to ensure changes are appropriately approved before going to verification. In other words, when the threshold is reached, a code review of the changes is automatically requested to ensure the amount of code is really needed.

The skilled person will appreciate that the above embodiments introduce a number of features which may be associated in many different combinations beside those specifically described. For example, the step of review the code 507 may be integrated into the second embodiment, which itself need not include the step 409 of revising the code, and so on.

Optionally, the results of a count as carried out at step 305 may be used to revise expected values for the counts for other modules. For example if a module is found to contain extra code and more lines of code are present on a few files that belong to a particular component such as the component responsible for creating log files, this is an indicator that other parts of the same component may have unexpected counts as well, due to incomplete design, or wrong predictions for that component overall. Such factors may be used for example in automatically varying the threshold by which the actual value must exceed a predicted value in order to fail the test at step 306 and trigger code revision or rejection, thereby enabling a further automation of the verification process.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:
1. A method of consolidating machine readable code comprising the steps of: determining for a part of a programming project a projected size of source code for said part, measuring an actual size of said source code for said part, determin- ing whether the actual size of said source code for said part exceeds said projected size of the source code for said part, in a case where said actual size of source code for said part exceeds said projected size of source code for said part, rejecting said part, and in a case where said actual size of source code for said part does not exceed said projected size of source code for said part, (i) proceeding to integrate said part into said project, and then (ii) compiling said project;

wherein said step of measuring is carried out with a particular time frequency, when a user implements a save operation, when a user runs a debugging tool or when a user attempts to integrate said part into said project;

wherein a user is presented with an indicator of the proportion of the amount of code allotted to a particular project part has been used or otherwise warned of any deviation from the planned path as the code is written.

2. The method of claim 1 performing the further steps of, in the case where said part is rejected, processing said part so as to identify and remedy anomalous components, and resubmitting said part for integration to said project.

3. The method of claim 1 wherein said step of measuring the actual size of said part incorporates the steps of detecting the programming language in which said part is written, and invoking a counting tool adapted to the detected programming language.

4. The method of claim 1 comprising the further step of generating a report providing information gathered during said step of measuring.

5. The method of claim 1 wherein said step of measuring is carried out with sufficient frequency to maintain a running count of the code as it is written.

6. The method of claim 1 wherein said step of measuring is automatically initiated when a threshold is reached.

7. A system for consolidating machine readable code comprising: a data processor coupled to a memory, wherein said memory comprises code that is operable by the data processor for performing steps of: determining a projected size of a part of a programming project, measuring the actual size of said part, determining whether the size of said part exceeds said projected size, responsive to said part exceeding said projected size, rejecting said part, and responsive to said part not exceeding said projected size, (i) proceeding to integrate said part into said project, and (ii) compiling said project, wherein the part is written in source code, and the actual size of the part is the size of the source code;

wherein said step of measuring is carried out with a particular time frequency, when a user implements a save operation, when a user runs a debugging tool or when a user attempts to integrate said part into said project;

wherein a user is presented with an indicator of the proportion of the amount of code allotted to a particular project part has been used or otherwise warned of any deviation from the planned path as the code is written.

8. A computer program product for consolidating machine readable code, the computer program product comprising a non-transitory computer readable storage medium having instructions stored therein for carrying out a method when said instructions are executed on a computer, the method comprising the steps of: determining a projected size of a part of a programming project, measuring the actual size of said part, determining whether the size of said part exceeds said projected size, in a case where said part exceeds said projected size, rejecting said part, and in a case where said part does not exceed said projected size, (i) proceeding to integrate said part into said project, and (ii) compiling said project, wherein the part is written in source code, and the actual size of the part is the size of the source code;

wherein said step of measuring is carried out with a particular time frequency, when a user implements a save operation, when a user runs a debugging tool or when a user attempts to integrate said part into said project;

wherein a user is presented with an indicator of the proportion of the amount of code allotted to a particular project part has been used or otherwise warned of any deviation from the planned path as the code is written.

9. The method of claim 1 wherein the actual size of the source code is determined prior to compiling the source code.

10. The method of claim 1 wherein the part is a sub-portion of the project, and the project comprises multiple sub-portion parts.

11. The method of claim 2 wherein the completed project part is a sub-portion of the project, and the project comprises multiple sub-portion parts.

12. The computer program product of claim 8 wherein the actual size of the source code is determined prior to compiling the source code.

13. The computer program product of claim 8 wherein the part is a sub-portion of the project, and the project comprises multiple sub-portion parts.

\* \* \* \* \*